US010119401B2

(12) United States Patent
Maeda et al.

(10) Patent No.: US 10,119,401 B2
(45) Date of Patent: Nov. 6, 2018

(54) BALANCE CORRECTION DEVICE FOR ROTOR

(71) Applicant: TOYOTA JIDOSHA KABUSHIKI KAISHA, Toyota-shi (JP)

(72) Inventors: Osamu Maeda, Toyota (JP); Koji Nomura, Toyota (JP); Tatsuo Iida, Anjo (JP); Takahiro Sadamitsu, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 186 days.

(21) Appl. No.: 15/190,618

(22) Filed: Jun. 23, 2016

(65) Prior Publication Data

US 2017/0009585 A1 Jan. 12, 2017

(30) Foreign Application Priority Data

Jul. 6, 2015 (JP) ................................ 2015-135042

(51) Int. Cl.
*B23K 26/00* (2014.01)
*F01D 5/02* (2006.01)
*F04D 29/66* (2006.01)

(52) U.S. Cl.
CPC ............ *F01D 5/027* (2013.01); *F04D 29/662* (2013.01); *F05D 2220/40* (2013.01)

(58) Field of Classification Search
CPC ..... F04D 29/662; F01D 5/027; F05D 2220/40
USPC ..... 219/110, 121.62, 121.66, 121.81, 121.85
See application file for complete search history.

(56) References Cited

U.S. PATENT DOCUMENTS 6,245,058 B1 * 6/2001 Suzuki .................... A61F 9/008 219/121.62
2003/0052094 A1 * 3/2003 Sorg ..................... B23K 11/002 219/110
2013/0334184 A1 * 12/2013 Liu ....................... B23K 26/36 219/121.81

FOREIGN PATENT DOCUMENTS

| | | |
|---|---|---|
| CN | 102472689 A | 5/2012 |
| JP | 64-40191 | 2/1989 |
| JP | 2011-112514 | 6/2011 |

* cited by examiner

*Primary Examiner* — Phuong Nguyen
(74) *Attorney, Agent, or Firm* — Oblon, McClelland, Maier & Neustadt, L.L.P.

(57) ABSTRACT

An imbalance correction position of a turbine wheel head is irradiated with a laser beam so that an outer peripheral portion of the turbine wheel head is left, and a groove provided by the laser irradiation is provided so that a depth of the groove is shallower toward a side closer to an outer periphery of the turbine wheel head. This makes it possible to secure a strength of a base part of an outer peripheral portion (an outer wall) of the groove, thereby making it possible to restrain deformation of the outer peripheral portion of the groove due to a centrifugal force acting by rotation of the turbine wheel head.

6 Claims, 8 Drawing Sheets

$m1 \cdot d1 = m2 \cdot d2 = m3 \cdot d3$

BALANCE CORRECTION DEVICE FOR ROTOR

INCORPORATION BY REFERENCE

The disclosure of Japanese Patent Application No. 2015-135042 filed on Jul. 6, 2015 including the specification, drawings and abstract is incorporated herein by reference in its entirety.

BACKGROUND

1. Technical Field

The present disclosure relates to a balance correction device for a rotor such as a compressor impeller or a turbine wheel of a turbocharger. The balance correction device corrects balance of the rotor.

2. Description of Related Art

As a balance correction device for a rotor, there is a device that corrects imbalance of a rotor in such a manner that: an imbalance amount and an imbalance correction position of a rotor are measured; an imbalance correction position of the rotor is irradiated with a laser beam in a state where the rotor is rotated; and a weight at the imbalance correction position is removed (see, for example, Japanese Patent Application Publication No. 2011-112514 (JP 2011-112514 A)).

SUMMARY

In the meantime, in the balance correction device for the rotor, at the time when the rotor is irradiated with the laser beam to remove the weight, it is conceivable that a weight at a position on an inner side relative to an outer peripheral edge of the rotor is removed (an outer wall is left outside a removed part) in order to restrain scattering of removed substances. However, in this case, a strength (a strength of the outer wall thus left) of an outer peripheral portion of a groove provided by weight removal is low. This may result in that the outer peripheral portion of the groove deforms due to a centrifugal force of the rotor.

In view of the above problem, the present disclosure provides a technique that can restrain deformation of an outer peripheral portion of a groove provided by laser irradiation in a balance correction device that corrects balance by laser irradiation with respect to a rotor.

In view of this, one aspect of the present disclosure provides a balance correction device for a rotor, the balance correction device correcting balance of the rotor. The balance correction device includes a rotary drive device, a laser irradiation device, a rotation angle sensor, an irradiation position setting device, and a controller. The rotary drive device is configured to rotate the rotor around a rotation axis. The laser irradiation device is configured to remove a part of the rotor by irradiating the rotor with a laser beam from a rotation-axis direction. The rotation angle sensor is configured to detect a rotation angle of the rotor. The irradiation position setting device is configured to set a laser irradiation position in a radial direction of the rotor. The controller is configured to control the rotary drive device, the laser irradiation device, and the irradiation position setting device. The controller is configured to irradiate an imbalance correction position of the rotor with the laser beam based on an output of the rotation angle sensor so as to leave an outer peripheral portion of the rotor. Further, the controller is configured to control a radial position of the laser irradiation position, a rotation speed of the rotor, and a laser output of the laser irradiation device so as to make a groove depth, in the rotation-axis direction, of a groove provided by the laser irradiation shallower toward a side closer to an outer periphery of the rotor.

In the balance correction device, the groove provided by the laser irradiation with respect to the rotor is provided such that its groove depth is shallower toward the side closer to the outer periphery of the rotor. This makes it possible to secure a strength of a base part of the outer peripheral portion (an outer wall) of the groove, thereby making it possible to restrain deformation of the outer peripheral portion of the groove due to a centrifugal force acting by rotation of the rotor.

Further, in the balance correction device, the controller may be configured to: (i) control the rotation speed of the rotor and the laser output so as to deposit a molten material (molten metal) generated by the laser irradiation in the groove; and (ii) provide the groove so as to make its groove depth shallower toward the side closer to the outer periphery of the rotor, by moving the laser irradiation position with respect to the rotor from an outer side to an inner side in the radial direction of the rotor. Further, in the balance correction device, the controller may be configured to increase the rotation speed of the rotor as the laser irradiation position comes inward in the radial direction. According to such a balance correction device, it is possible to more efficiently deposit the molten material (molten metal) generated by the laser irradiation, on an outer peripheral side in the groove.

In the balance correction device, the controller may be configured to: (i) move the laser irradiation position with respect to the rotor from an inner side to an outer side in the radial direction of the rotor; and (ii) decrease a removal amount by the laser irradiation to be smaller as the laser irradiation position with respect to the rotor comes closer to the outer periphery of the rotor. According to such a balance correction device, the groove provided by the laser irradiation with respect to the rotor can be provided so as to make its groove depth shallower toward the side closer to the outer periphery of the rotor.

The balance correction device may further include an acceleration sensor configured to detect an acceleration of the rotor. The controller may be configured to determine the imbalance correction position of the rotor based on respective outputs from the rotation angle sensor and the acceleration sensor. In a case of such a balance correction device, it is possible to perform balance correction by the laser irradiation continuously with the determination of the imbalance correction position.

According to the balance correction device, in a balance correction device that performs balance correction by laser irradiation to a rotor, it is possible to restrain deformation of an outer peripheral portion of a groove provided by the laser irradiation.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
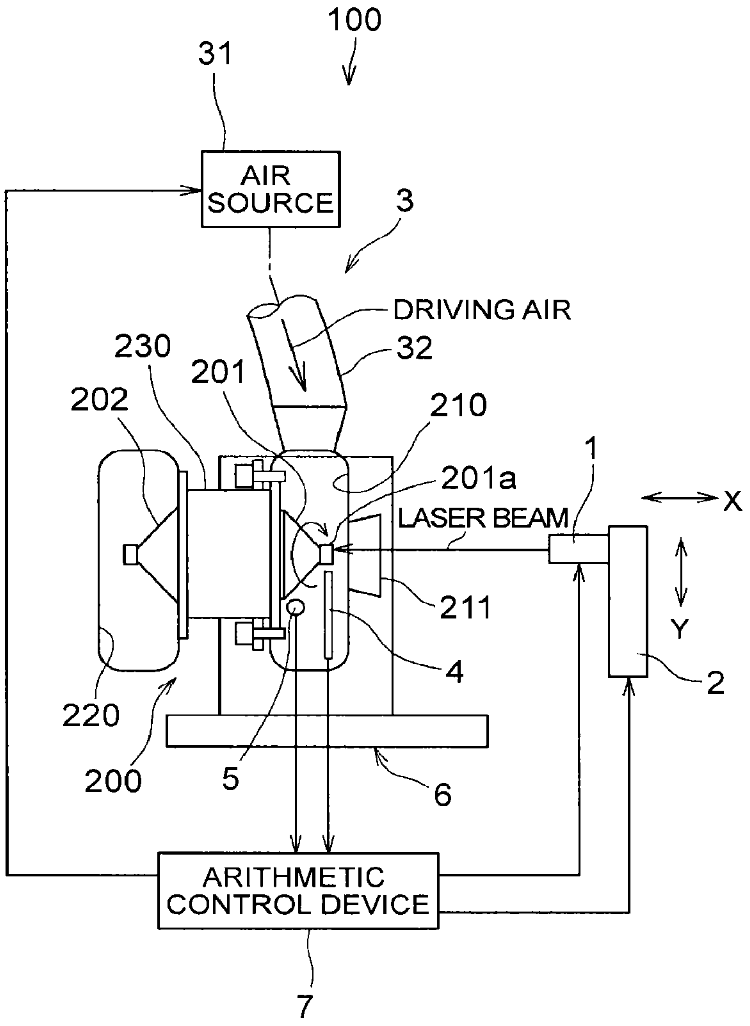
FIG. 1 is a schematic configuration diagram illustrating one example of a balance correction device.

Embodiments are described below with reference to the drawings. Initially described is a first embodiment is with reference to FIG. 1 as an example of a turbocharger 200 in which balance correction is performed.

The turbocharger 200 in this example is constituted by a turbine wheel (e.g., made of Inconel (registered trademark)) 201, a compressor impeller (e.g., made of aluminum alloy) 202, a connecting shaft (not shown), and so on. The connecting shaft is a shaft that connects the turbine wheel 201 to the compressor impeller 202 in an integrated manner. The turbine wheel 201 is accommodated in a turbine housing 210, and the compressor impeller 202 is accommodated in a compressor housing 220. A channel (a scroll) through which a fluid flows is formed in the turbine housing 210. The fluid rotationally drives the turbine wheel 201.

Further, a bearing (not shown) that supports the connecting shaft is accommodated in a center housing 230, and the turbine housing 210 and the compressor housing 220 are attached to both sides of the center housing 230.

Next will be described a balance correction device. A balance correction device 100 of the present embodiment includes a laser oscillator 1, a laser moving device 2, a driving air feeder 3, a rotation angle sensor 4, an acceleration sensor 5, a trestle 6, an arithmetic control device 7, and so on.

Note that the laser oscillator 1 is one example of a “laser irradiation device”. The laser moving device 2 is one example of an “irradiation position setting device”. The driving air feeder 3 is one example of a “rotary drive device”. Further, the arithmetic control device 7 is one example of a “controller”.

The trestle 6 can support the turbocharger 200 releasably. In a state where the turbocharger 200 is supported by the trestle 6, a rotation center of the turbocharger 200 (a rotation center of the turbine wheel 201) is along a horizontal direction (an X-direction).

The laser oscillator 1 is a semiconductor laser that can generate a pulse, for example. The laser oscillator 1 is placed such that its optical axis is along the horizontal direction (a direction parallel to a rotation axis of the turbine wheel 201). The laser oscillator 1 can irradiate the turbine wheel head 201*a* with a pulsed laser beam (hereinafter just referred to as the “laser beam”) from a rotation-axis direction (the X-direction) of the turbine wheel 201. The turbine wheel head 201*a* is a columnar head of the turbine wheel (a rotor) 201 of the turbocharger 200 attached to the trestle 6. A part of the turbine wheel 201 can be removed by the laser irradiation. Driving of the laser oscillator 1 is controlled by the arithmetic control device 7.

Note that the laser beam emitted from the laser oscillator 1 passes through a discharge port 211 of the turbine housing 210 so as to be applied to the turbine wheel 201 inside the housing.

The laser moving device 2 moves the laser oscillator 1 in a radial direction of the turbine wheel 201 (in a direction perpendicular to the rotation axis of the turbine wheel 201: a Y-direction). When the laser moving device 2 moves the laser oscillator 1, a laser irradiation position on the turbine wheel 201 can be set by moving the laser irradiation position in the radial direction of the turbine wheel 201.

The driving air feeder 3 includes an air source 31 and an air duct 32. The air duct 32 is connected to a scroll inlet of the turbine housing 210, so that driving air from the air source 31 can be supplied to a scroll of the turbine housing 210. By supplying the driving air to the scroll, the driving air flows through the turbine wheel 201 to rotate the turbine wheel 201. A rotation speed of the turbine wheel 201 can be set changeably by adjusting a flow rate of the driving air output from the air source 31 (a flow rate of the driving air to flow through the turbine wheel 201). The flow rate of the driving air output from the air source 31 is controlled by the arithmetic control device 7.

The rotation angle sensor 4 is placed in the vicinity of the turbine wheel head 201*a* of the turbocharger 200 mounted to the trestle 6. The rotation angle sensor 4 detects a phase (a rotation angle) from a reference position set in the turbine wheel head 201*a*. A rotation angle and a rotation speed (a turbine rotation speed) of the turbine wheel 201 can be measured based on an output signal from the rotation angle sensor 4. The output signal from the rotation angle sensor 4 is input into the arithmetic control device 7. As the rotation angle sensor 4, various sensors such as a magnetic sensor and an optical sensor are applicable.

Note that the reference position is set by processing such as paint application to the turbine wheel head 201*a*, seal attachment thereto, or notching. Further, the rotation angle detected by the rotation angle sensor 4 changes from 0 degrees to 360 degrees when the turbine wheel head 201*a* makes one rotation from the reference position (=0 degrees).

The acceleration sensor 5 is attached to the trestle 6 that supports the turbocharger 200. The acceleration sensor 5 detects vibrations of the trestle 6 (an acceleration of the rotor) at the time when the turbocharger 200 (the turbine wheel 201) rotates. An output signal from the acceleration sensor 5 is input into the arithmetic control device 7.

The arithmetic control device 7 is a personal computer, for example, and includes a CPU (Central Processing Unit), a ROM (Read Only Memory), a RAM (Random Access Memory), a backup RAM, an input-output interface, and so on.

The CPU performs a computing process based on various control programs, maps, and the like stored in the ROM. The ROM stores therein various control programs, maps referred to when such various control programs are executed, and so on. The RAM is a memory in which to temporarily store a computing result and the like by the CPU. The backup RAM is a nonvolatile memory in which to store data and the like to be stored when the arithmetic control device 7 is turned off The laser oscillator 1, the laser moving device 2, the driving air feeder 3, the rotation angle sensor 4, the acceleration sensor 5, and the like are connected to the input-output interface of the arithmetic control device 7.

Next will be described one example in a case where balance correction (imbalance determination and laser irradiation) is performed using the balance correction device 100 described above.

The following describes imbalance determination. First, the arithmetic control device 7 makes a determination about an imbalance correction amount and an imbalance correction position by processes of the following (ST101) to (ST103). The processes of (ST101) to (ST103) are performed by the arithmetic control device 7.

Initially, the following describes ST101. As illustrated in FIG. 1, the turbocharger 200 is attached to the trestle 6 of the balance correction device 100. The turbocharger 200 is a balance correction object. In this state, the driving air feeder 3 is controlled to rotate the turbine wheel 201 by driving air, so that a rotation speed (hereinafter also referred to as a turbine rotation speed) of the turbine wheel 201 is increased. In a predetermined rotation speed range during the increase of the turbine rotation speed, an output signal of the rotation angle sensor 4 and an output signal of the acceleration sensor 5 are extracted. Based on rotation angle data and acceleration data (vibrational data) thus extracted by such a tracking operation, an imbalance amount (an amplitude of an acceleration (vibration)) and an imbalance phase (angle) with respect to the reference position are found.

(ST102) The laser oscillator 1 and the laser moving device 2 are controlled to perform dummy irradiation of a one-pulse laser beam with respect to a given phase position of the turbine wheel head 201*a*. Hereby, a part of the turbine wheel head 201*a* is removed. After that, an output signal of the rotation angle sensor 4 and an output signal of the acceleration sensor 5 are extracted by a tracking operation similar to the above. Based on rotation angle data and acceleration data thus extracted, an imbalance amount (an amplitude of an acceleration (vibration)) and an imbalance phase (angle) with respect to the reference position are found.

(ST103) An imbalance correction amount (a weight removal amount) and an imbalance correction position (phase) are determined by a well-known technique based on a difference (a change in the imbalance amount before and after the dummy irradiation) between the imbalance amount provided in the process of (ST101) and the imbalance amount provided in the process of (ST102) and based on a difference (an imbalance phase change before and after the dummy irradiation) between the imbalance phase provided in the process of (ST101) and the imbalance phase provided in the process of (ST102).

Note that the determinations about the imbalance correction amount and the imbalance correction position may be performed by different devices.

[Laser Irradiation] After the imbalance determination is finished, the laser irradiation is continued in a state where the turbocharger 200 is attached to the trestle 6.

More specifically, the laser moving device 2 is controlled to set a position of the laser oscillator 1 so that a radially inner position relative to an outer peripheral edge of the turbine wheel head 201*a* (a position that leaves 0.5 mm or more of an outer peripheral portion of the turbine wheel head 201*a* after the removal) is irradiated with the laser beam.

Then, the driving air feeder 3 is controlled to maintain the turbine rotation speed at a constant speed. In this state, based on an output signal of the rotation angle sensor 4, an output timing (an irradiation timing of the laser beam) of the laser oscillator 1 is controlled. The control is described in detail.

At the time when the turbine wheel head 201*a* rotates, the imbalance correction position (phase) determined by the above process rotates. Therefore, the imbalance correction position passes an optical axis (a laser irradiation position) of the laser oscillator 1 every predetermined time. Accordingly, the laser oscillator 1 is controlled so that the pulsed laser beam is emitted at the time when the imbalance correction position is placed at the laser irradiation position. Hereby, a weight at the imbalance correction position can be removed.

However, the turbine wheel head 201*a* rotates and the pulsed laser beam has a time width (pulse duration). Therefore, if an output of the pulsed laser beam is started at the time when the imbalance correction position comes at the laser irradiation position, a part to be removed by the laser irradiation deviates from the imbalance correction position in a rotation direction. In view of this, in the present embodiment, as illustrated in FIG. 2A, the output of the pulsed laser beam (output of one pulse) is started at a timing of "$-\theta$ degree" with respect to the imbalance correction position, and the output of the pulsed laser beam is finished at a timing of "$+\theta$ degree." Note that the angle $\theta$ in FIG. 2A is determined by the turbine rotation speed and a pulse duration of one pulse of the pulsed laser beam.

A removal amount by the laser irradiation of one pulse with respect to the imbalance correction position is determined by a material of the turbine wheel head 201*a* and a laser output (energy) of the laser oscillator 1. Generally, a removal amount by one (one pulse) laser irradiation to the imbalance correction position cannot satisfy the imbalance correction amount (the weight removal amount). On this account, in a rotational process of the turbine wheel 201, the laser irradiation is performed repeatedly every time the imbalance correction position is placed on the optical axis of the laser oscillator 1.

Figure 2A:
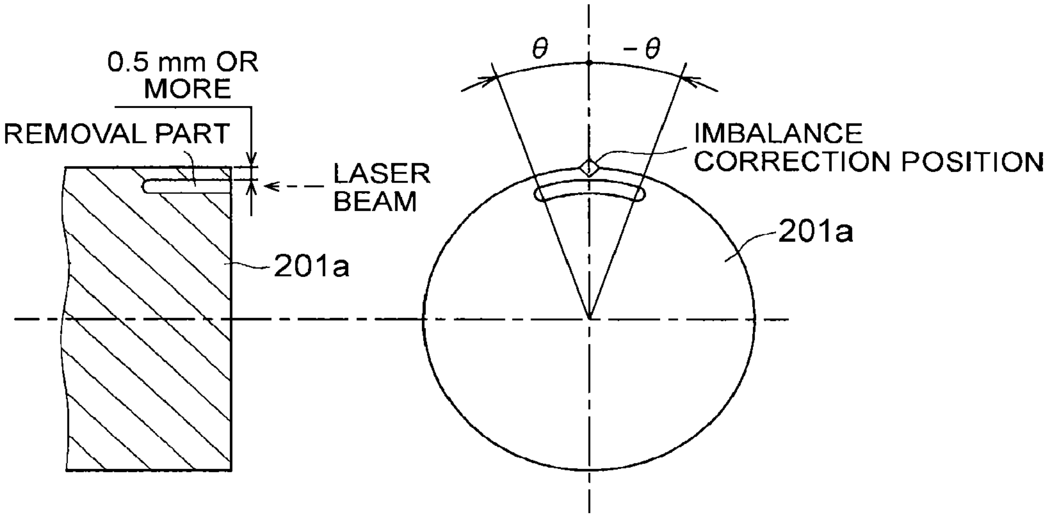
FIGS. 2A and 2B are views illustrating an imbalance correction position and a laser irradiation position in the balance correction device.
Figure 2B:
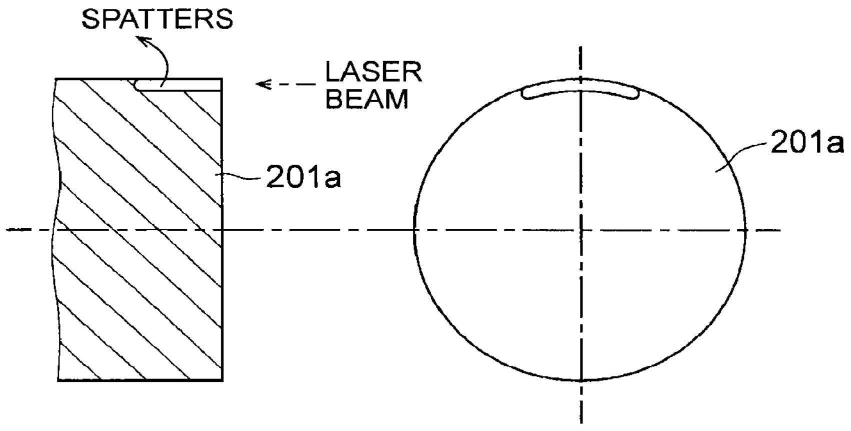

Here, in the present embodiment, as described above, the radially inner position relative to the outer peripheral edge of the turbine wheel head 201*a* is irradiated with the laser beam so that 0.5 mm or more of the outer peripheral portion of the turbine wheel head 201*a* is left, as illustrated in FIG. 2A. The reason for this is described below. As illustrated in FIG. 2B, when the outer peripheral portion of the turbine wheel head 201*a* is irradiated with the laser beam, spatters (metal removal substances) scattered by the laser irradiation may adhere to the turbine wheel 201 (a turbine blade). In order to avoid such a trouble, the laser beam is applied such that 0.5 mm or more of the outer peripheral portion of the turbine wheel head 201*a* is left, as illustrated in FIG. 2A. This reduces scattering of the spatters to a turbine-wheel-201 side, thereby restraining the adhesion of the spatters to the turbine wheel 201.

Next will be described movement (radial movement) of the laser irradiation position.

First, in a case where balance correction is performed, it is general to perform removal from an outer peripheral side of the rotor from the viewpoint of shortening a time for the balance correction. This is because the outer peripheral side of the rotor has a larger radius and an imbalance removal amount (a removal weight X radius) is large. Here, when a groove to be provided by the laser irradiation is deep, a focal position of the laser beam from the laser oscillator 1 may deviate. For this reason, there is a limitation on a depth (a depth in the rotation-axis direction) of a groove that can be provided by removal by the laser irradiation. On this account, only by the removal of the outer peripheral portion (a removed part illustrated in FIG. 2A) of the rotor, the imbalance correction amount (the weight removal amount) may be insufficient. In that case, the laser irradiation position is moved radially inward to perform removal by the laser irradiation.

Figure 5C:
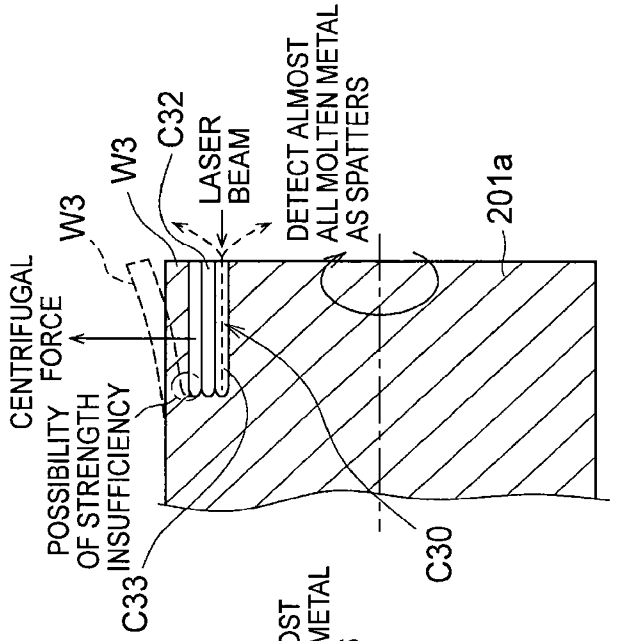
FIGS. 5A, 5B, 5C are explanatory views of a problem in a case where a turbine rotation speed is low at the time when balance correction is performed in the balance correction device.
Figure 5B:
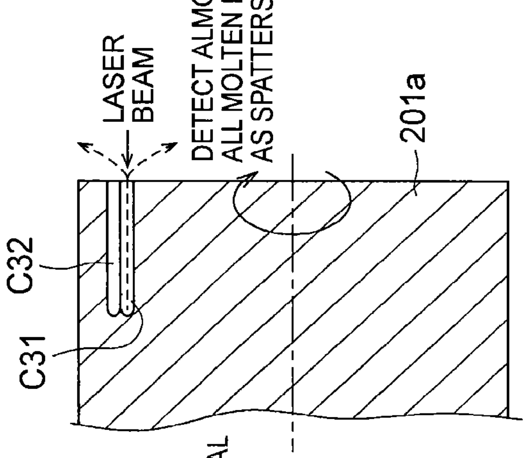
Figure 5A:
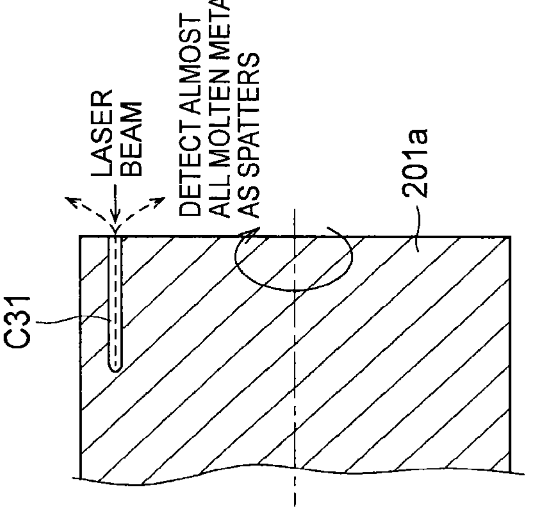

More specifically, for example, as illustrated in FIG. 5A, an outermost position of the turbine wheel head 201*a* is irradiated with the laser beam so as to remove this part. Subsequently, the laser irradiation position is moved radially inward to perform the laser irradiation, so that a part (a part C32) placed on an inner side relative to the part (a groove C31) thus removed earlier is removed as illustrated in FIG. 5B. Further, the laser irradiation position is moved radially inward to perform the laser irradiation, so that a part (a part C33) placed on the inner side relative to the part (a groove C32) thus removed earlier is removed as illustrated in FIG. 5C. Such a process is performed so as to satisfy the imbalance correction amount.

In the meantime, in a case where the turbine rotation speed at the time of the balance correction (the rotation speed at the time of the laser irradiation) is low, almost all molten metal removed by the laser irradiation is discharged as spatters as illustrated in FIGS. 5A to 5C. This may result in that a strength of a base part of the outer peripheral portion (an outer wall W3) outside a groove C30 provided by the laser irradiation is insufficient. On this account, in a use rotation range of the turbocharger 200, the outer wall W3 of the outer peripheral portion outside the groove C30 may deform outward due to a centrifugal force, as indicated by a broken line in FIG. 5C.

In order to solve such a problem, in the present embodiment, the turbine rotation speed (the rotation speed of the turbine wheel 201) is set to be high so as to adjust a laser output of the laser oscillator 1. This allows molten metal generated by the laser irradiation to be actively deposited in a groove provided by the laser irradiation, thereby securing a strength of the base part of the outer peripheral portion of the groove.

Note that it is confirmed by the inventors of the present disclosure by experiment or the like that the molten metal is deposited in the groove by setting the rotation speed of the turbine wheel 201 to be high so as to adjust the laser output of the laser oscillator 1.

Next will be described one example of a control (the laser irradiation) in a case where the molten metal is actively deposited in the groove provided by the laser irradiation, with reference to a flowchart of FIG. 3.

The control example shows an example in which the imbalance correction amount is insufficient only by the removal of the outer peripheral portion (the removed part illustrated in FIG. 2A) of the turbine wheel head 201*a*, so the imbalance correction amount (the weight removal amount) is removed in the following process: the outer peripheral portion (the outermost position) of the turbine wheel head 201*a* is irradiated with the laser beam; the laser irradiation position is further moved twice inward in the radial direction of the turbine wheel head 201*a*; and the laser irradiation position is irradiated with the laser beam.

Figure 3:
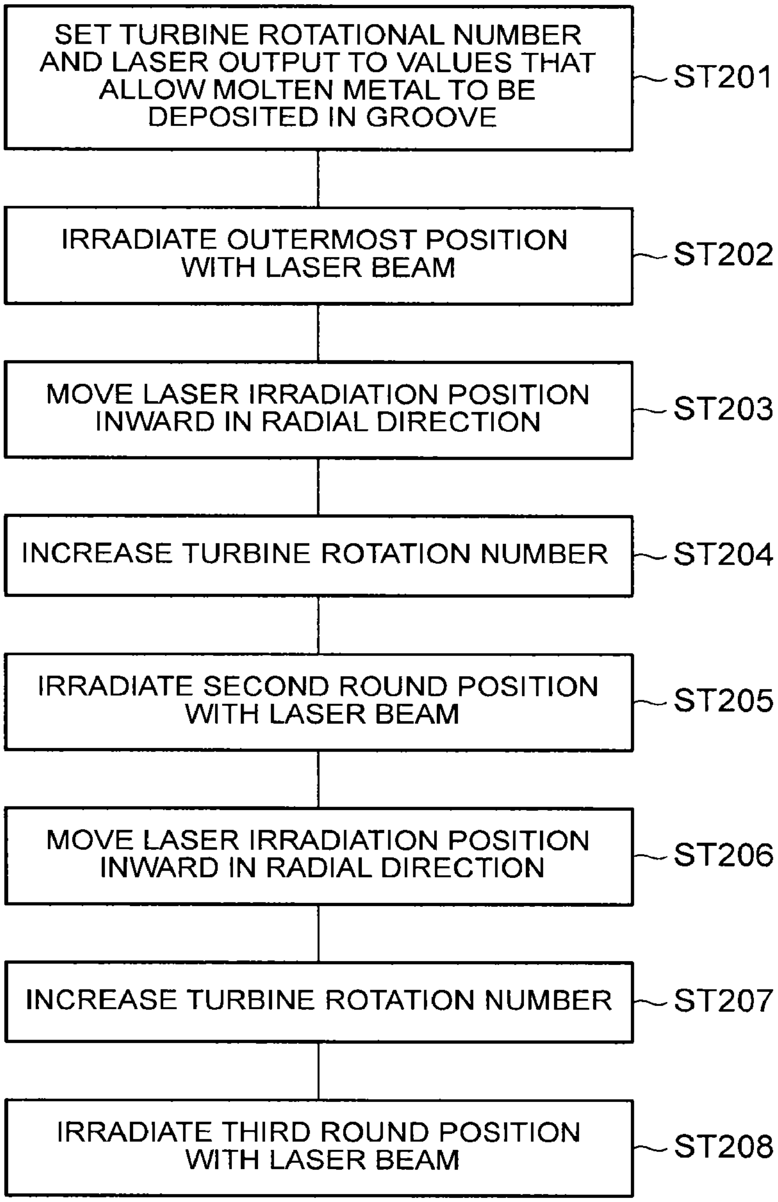
FIG. 3 is a flowchart illustrating one example of a control in a case where molten metal is actively deposited in a groove in a first embodiment.

The control (the laser irradiation) illustrated in FIG. 3 is performed continuously in a state where the turbocharger 200 is attached to the trestle 6 after the aforementioned imbalance determination is performed.

Figure 4A:
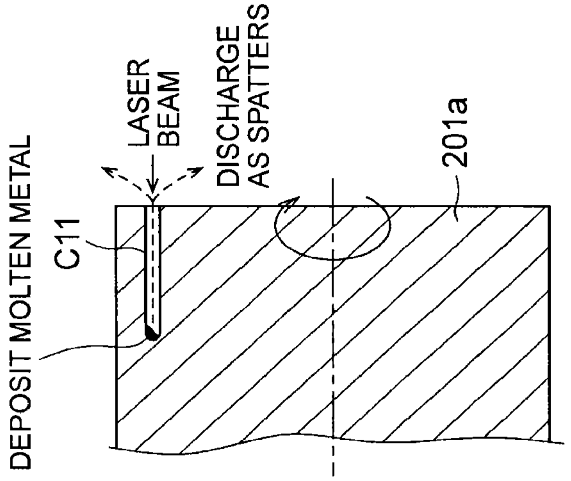
FIGS. 4A, 4B, 4C are views schematically illustrating a state where a depth of the groove is made shallower toward a side closer to an outer periphery by actively depositing the molten metal in the groove in the first embodiment.

When the control of FIG. 3 is started, the driving air feeder 3 and the laser oscillator 1 are controlled first in step ST201, so as to set a turbine rotation speed (a rotation speed of the rotor) and a laser output of the laser oscillator 1 so that molten metal is deposited in a first groove C11, as illustrated in FIG. 4A. The turbine rotation speed for depositing the molten metal in the first groove C11 is 30000 rpm or more, for example. Further, the laser output should be a laser output by which not all the molten metal spatters but some of the molten metal remains in the groove C11. The laser output is set to a suitable value obtained by experiment/simulation in consideration of a relationship with the turbine rotation speed.

In step ST202, a weight at the imbalance correction position is removed such that an outermost position (a first round position) of the turbine wheel head 201*a* of the turbocharger 200 attached to the trestle 6 is irradiated with the laser beam at an irradiation timing illustrated in FIG. 2A under conditions (the turbine rotation speed and the laser output) set in step ST201. The outermost position is a position that is closer to the outer peripheral edge of the turbine wheel head 201*a* (a position that leaves 0.5 mm or more of the outer peripheral portion of the turbine wheel head 201*a*, for example, after the weight removal). The laser irradiation with respect to the outermost position is performed until a weight removal amount (except the after-mentioned deposition amount of molten metal) to be removed by the laser irradiation reaches an amount corresponding to one-third of the imbalance correction amount, for example.

When the laser irradiation is performed with respect to the outermost position under the conditions (the turbine rotation speed and the laser output) set in step ST201 as such, not all the molten metal spatters, but some of the molten metal is deposited in a deep end of the first groove C11 with as illustrated in FIG. 4A. A deposition amount of the molten metal is larger toward an outer peripheral side of the first groove C11 due to a centrifugal force. That is, a groove depth of the first groove C11 is shallower toward a side closer to an outer periphery of the turbine wheel head 201*a*.

When the laser irradiation with respect to the outermost position is finished, the process proceeds to step ST203. In step ST203, the laser moving device 2 is controlled to move the laser oscillator 1 inward (toward a rotation center) in the radial direction (the Y-direction) only by a distance corresponding to an irradiation diameter of the laser beam (a radial width of a part to be removed by the laser irradiation). Hereby, the laser irradiation position is moved from the outermost position (the first round position) to a second round position on an inner side relative to the outermost position.

In step ST204, the driving air feeder 3 is controlled to set the turbine rotation speed (the rotation speed of the turbine wheel 201) to be higher than that of the laser irradiation with respect to the outermost position (to set the turbine rotation speed so that the centrifugal force increases). The laser output of the laser oscillator 1 is maintained at the value set in step ST201.

In step ST205, the second round position of the turbine wheel head 201*a* is irradiated with the laser beam at the irradiation timing as illustrated in FIG. 2A, so as to remove a weight at the imbalance correction position (phase). The laser irradiation with respect to the second round position is also performed until a weight removal amount (except the after-mentioned deposition amount of the molten metal) to be removed by the laser irradiation reaches an amount corresponding to one-third of the imbalance correction amount, for example.

Figure 4B:
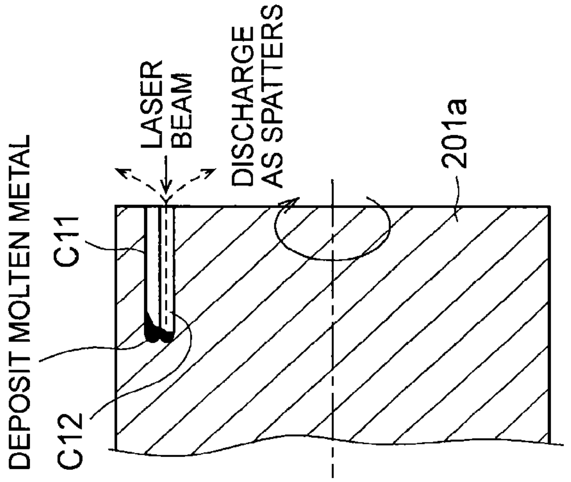

By performing the laser irradiation with respect to the second round position as such, a second groove C12 is provided in a state where the second groove C12 is connected to the first groove C11 provided earlier by the laser irradiation, as illustrated in FIG. 4B. Also in the laser irradiation with respect to the second round position, not all molten metal spatters, but some of the molten metal remains in the second groove C12 so as to be deposited in a deep end of the second groove C12. Further, since the turbine rotation speed is increased to increase the centrifugal force, the molten metal generated by the laser irradiation with respect to the second round position also flows, due to such a large centrifugal force, into the first groove C11 provided earlier such that the molten metal is deposited so as to cover deposits in the deep end of the first groove C11. Besides, the deposition amount to be deposited in the first groove C11 becomes larger toward the outer peripheral side of the turbine wheel head 201*a* due to the large centrifugal force. Hereby, as illustrated in FIG. 4B, a total depth of a groove provided such that two grooves C11, C12 are connected to each other becomes shallower toward a side closer to the outer periphery of the turbine wheel head 201*a*.

When the laser irradiation with respect to the second round position is finished, the process proceeds to step ST206. In step ST206, the laser moving device 2 is controlled to move the laser oscillator 1 inward (toward the rotation center) in the radial direction (the Y-direction) only by a distance corresponding to the irradiation diameter of the laser beam (a radial width of a part to be removed by the laser irradiation). Hereby, the laser irradiation position is moved from the second round position to a third round position on the inner side relative to the second round position.

In step ST207, the driving air feeder 3 is controlled to set the turbine rotation speed (the rotation speed of the turbine wheel 201) to be higher than that of the laser irradiation with respect to the second round position (to set the turbine rotation speed so that the centrifugal force increases). The laser output of the laser oscillator 1 is maintained at the value set in step ST201.

In step ST208, the third round position of the turbine wheel head 201*a* is irradiated with the laser beam at the irradiation timing as illustrated in FIG. 2A, so as to remove a weight at the imbalance correction position (phase). The laser irradiation with respect to the third round position is also performed until a weight removal amount (except the after-mentioned deposition amount of the molten metal) to be removed by the laser irradiation reaches an amount corresponding to one-third of the imbalance correction amount, for example.

Figure 4C:
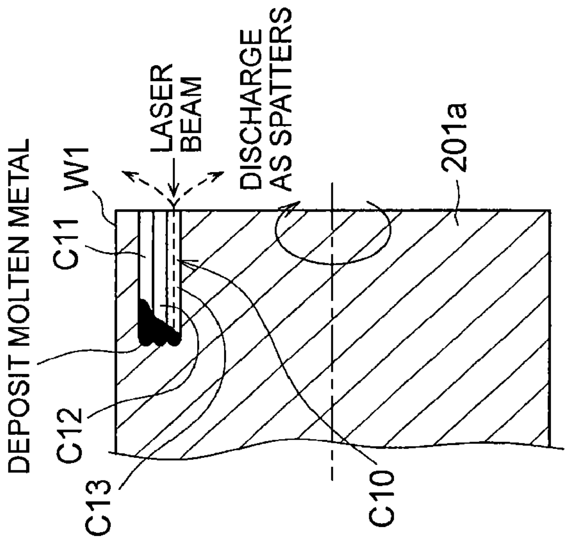

By performing the laser irradiation with respect to the third round position, a third groove C13 is provided in a state where the third groove C13 is connected to the second groove C12 provided earlier by the laser irradiation, as illustrated in FIG. 4C. Also in the laser irradiation with respect to the third round position, not all molten metal spatters, but some of the molten metal remains in the third groove C13 so as to be deposited in a deep end of the third groove C13. Further, since the turbine rotation speed is increased to increase the centrifugal force, the molten metal generated by the laser irradiation with respect to the third round position also flows, due to such a large centrifugal force, into the second groove C12 provided earlier and further into the first groove C11. Thus, the molten metal is deposited so as to cover deposits in respective deep ends of the second groove C12 and the first groove C11. Besides, the deposition amounts to be deposited in the second groove C12 and the first groove C11 become larger toward the outer peripheral side of the turbine wheel head 201*a* due to the large centrifugal force. Hereby, as illustrated in FIG. 4C, a total depth of a groove C10 (hereinafter also referred to as a corrected groove C10) provided such that three grooves C11, C12, C13 are connected to each other becomes shallower toward the side closer to the outer periphery of the turbine wheel head 201*a*.

When the corrected groove C10 is provided such that its groove depth is shallower toward the side closer to the outer periphery of the turbine wheel head 201*a* as such, it is possible to secure the strength of a base part of an outer wall W1 (see FIG. 4C) on the outer peripheral side of the corrected groove C10. Hereby, in the use rotation range of the turbocharger 200, it is possible to restrain deformation of the outer wall W1 on the outer peripheral side of the corrected groove C10.

This example deals with a case where three positions, i.e., the first to third round positions are irradiated with the laser beam. However, the imbalance correction amount may be removed such that two positions in the radial direction are irradiated with the laser beam or the imbalance correction amount may be removed such that four or more positions in the radial direction are irradiated with the laser beam.

Note that, even in a case where one position in the radial direction of the turbine wheel head 201*a* is irradiated with the laser beam, it is still possible to make the groove depth of the groove C11 shallower toward the side closer to the outer periphery of the turbine wheel head 201*a* by depositing the molten metal, as illustrated in FIG. 4A.

The following describes a second embodiment. This is an example different from the first embodiment in how to move (radially move) the laser irradiation position.

First, it is general to perform removal from the outer peripheral side of the rotor from the viewpoint of shortening a time for the balance correction, as described above. However, in a case where it is not necessary to shorten a balance correction time, a weight can be removed from an inner peripheral side of a rotor in a radial direction.

Figure 8C:
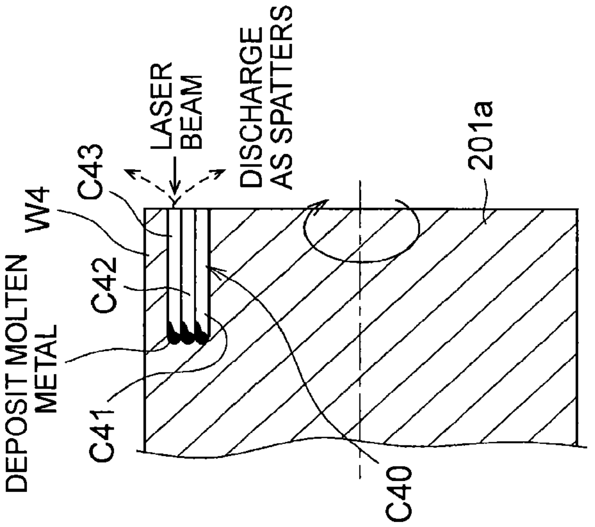
FIGS. 8A, 8B, 8C are views to describe a problem in a case where the laser irradiation position is moved from an inner side to the outer side in the radial direction of the turbine wheel head in the second embodiment of the balance correction device.
Figure 8B:
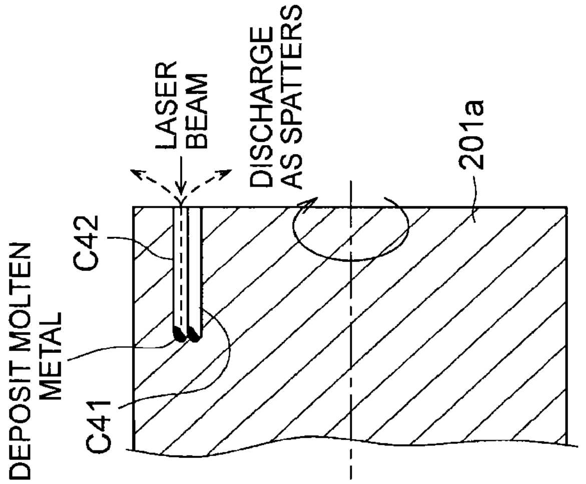
Figure 8A:
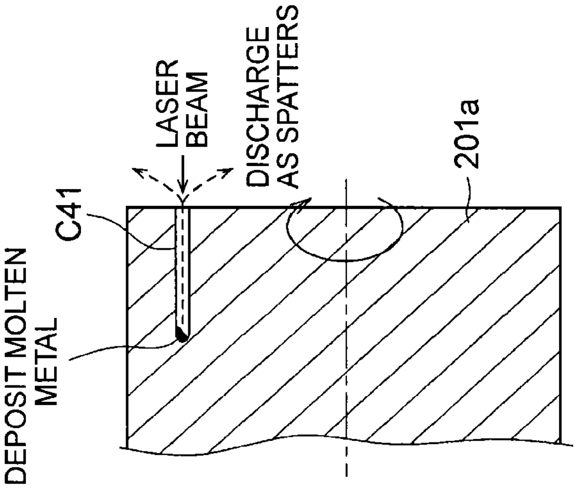

In this case, as illustrated in FIG. 8A, for example, a radially inner position of a turbine wheel head 201*a* is irradiated with a laser beam so as to remove this part. Subsequently, a laser irradiation position is moved radially outward to perform the laser irradiation, so that a part (a part C42) placed on an outer side relative to the part (a groove C41) removed earlier is removed as illustrated in FIG. 8B. Further, the laser irradiation position is moved radially outward to perform the laser irradiation, so that a part (a part C43) placed on the outer side relative to the part (a groove C42) removed earlier is removed as illustrated in FIG. 8C. Such a process is performed so as to satisfy the imbalance correction amount.

However, in a case where the weight is removed from the inner peripheral side in the radial direction in this manner, although molten metal is deposited in respective deep ends of the grooves C41, C42, C43, respectively, the molten metal cannot be deposited efficiently in a base part (a part with insufficient strength) of an outer peripheral portion (an outer wall W4) of a groove C40 that is finally provided, as illustrated in FIGS. 8A to 8C.

In order to solve such a problem, in the second embodiment, in a case where the laser irradiation position is moved from an inner side to an outer side in the radial direction of the turbine wheel head 201*a* to perform the laser irradiation, a removal amount by the laser irradiation is made smaller as the laser irradiation position comes closer to the outer side in the radial direction of the turbine wheel head 201*a*.

Hereby, a groove depth of a groove is made shallower toward a side closer to an outer periphery, thereby securing a strength of the base part of the outer peripheral portion of the groove. One example of the control is described with reference to a flowchart of FIG. 6.

The control example shows an example in which an imbalance correction amount is removed in the following process: an inner peripheral portion (a first round position) of the turbine wheel head 201*a* in the radial direction is irradiated with the laser beam; the laser irradiation position is further moved twice outward in the radial direction of the turbine wheel head 201*a*; and the laser irradiation position is irradiated with the laser beam.

Note that, as will be described later, in this example, a weight removal amount by the laser irradiation with respect to a first round position is assumed m1, a weight removal amount by the laser irradiation with respect to a second round position is assumed m2, and a weight removal amount by the laser irradiation with respect to a third round position is assumed m3, and the laser irradiation is performed such that a total amount of the weight removal amounts m1, m2, m3 reaches an amount corresponding to the imbalance correction amount.

Figure 6:
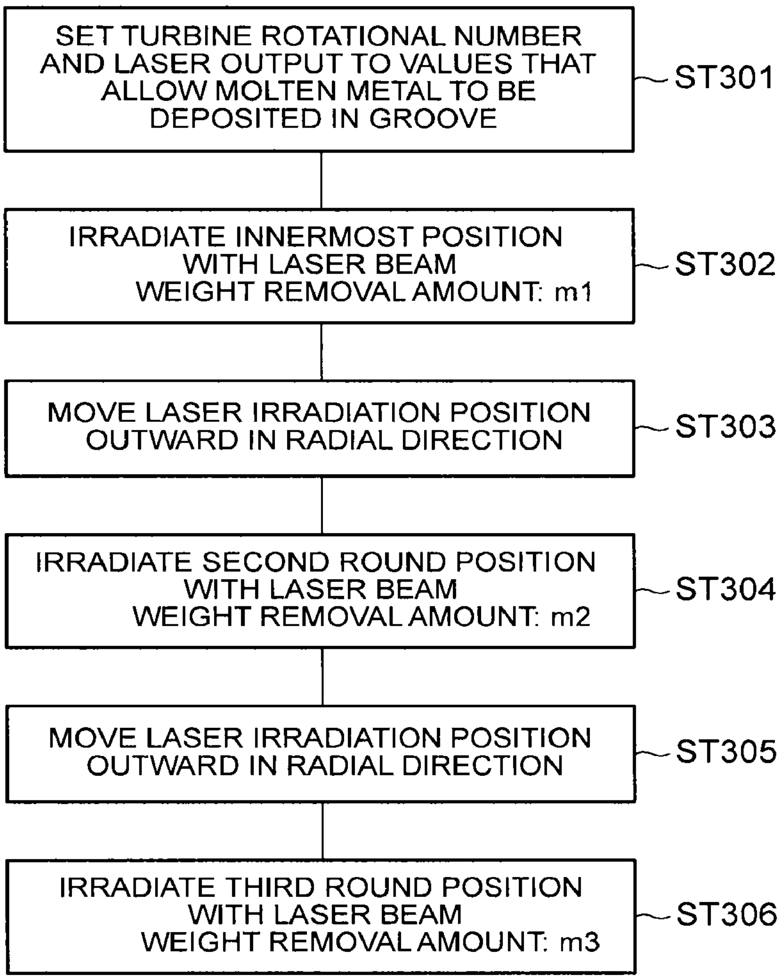
FIG. 6 is a flowchart illustrating one example of a control in a case where a removal amount is made smaller toward an outer side in a radial direction of a turbine wheel head, as a second embodiment.

The control (the laser irradiation) illustrated in FIG. 6 is performed continuously in a state where the turbocharger 200 is attached to the trestle 6 after the aforementioned imbalance determination is performed.

Figure 7A:
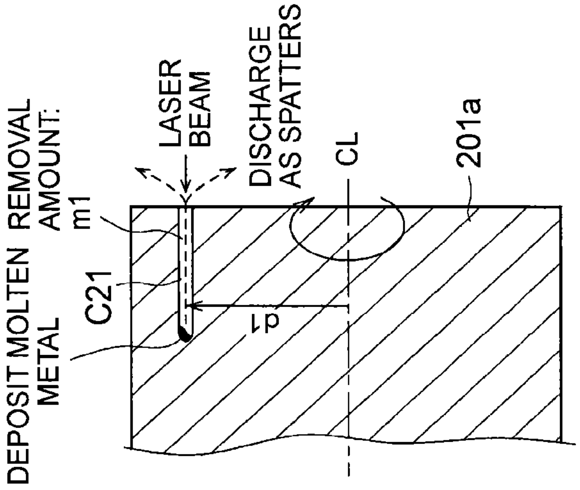
FIGS. 7A, 7B, 7C are views schematically illustrating a state where a depth of a groove is made shallower toward a side closer to an outer periphery by decreasing the removal amount to be smaller as a laser irradiation position comes closer to the outer side in the radial direction of the turbine wheel head, in the second embodiment.

When the control of FIG. 6 is started, a driving air feeder 3 and a laser oscillator 1 are controlled first in step ST301, so as to set a turbine rotation speed and a laser output of the laser oscillator 1 so that molten metal is deposited in a first groove C21, as illustrated in FIG. 7A. Note that how to set the turbine rotation speed and the laser output is the same as step ST201 described above, so descriptions thereof are omitted.

In step ST302, a weight at the imbalance correction position is removed such that the first round position (a position away from an outer peripheral edge of the turbine wheel head 201*a*) of the turbine wheel head 201*a* of the turbocharger 200 attached to the trestle 6 is irradiated with the laser beam at the irradiation timing illustrated in FIG. 2A under conditions (the turbine rotation speed and the laser output) set in step ST301. The first round position is a position at which a laser irradiation center is placed at a radius d1 from a rotation center CL of the turbine wheel head 201*a*. The laser irradiation with respect to the first round position is performed until a weight removal amount (except the after-mentioned deposition amount of molten metal) to be removed by the laser irradiation reaches an amount corresponding to the weight m1.

Note that a weight removal amount [removal amount/pulse] at the time of irradiation with a one-pulse laser beam is determined by a material of the turbine wheel head 201*a* and a laser output (energy) of the laser oscillator 1. On this account, an irradiation pulse number (an irradiation time of the laser beam with respect to the imbalance correction position) that can remove the weight m1 is set from the [removal amount/pulse] so as to perform the laser irradiation.

When the laser irradiation with respect to the first round position is finished, the process proceeds to step ST303. In step ST303, the laser moving device 2 is controlled to move the laser oscillator 1 outward in the radial direction (the Y-direction) only by a distance corresponding to an irradiation diameter of the laser beam (a radial width of a part to be removed by the laser irradiation). Hereby, the laser irradiation position is moved from the first round position to the second round position (a position at a radius d2: see FIG. 7B) on an outer side relative to the first round position.

In step ST304, the second round position of turbine wheel head 201*a* is irradiated with the laser beam at the irradiation timing as illustrated in FIG. 2A, so as to remove a weight at the imbalance correction position (phase). The removal amount m2 of the weight by the laser irradiation with respect to the second round position is set to be smaller than the removal amount m1 by the laser irradiation with respect to the first round position. Note that the removal amount m1 and the removal amount m2 has a relationship of m1·d1=m2·d2.

Figure 7B:
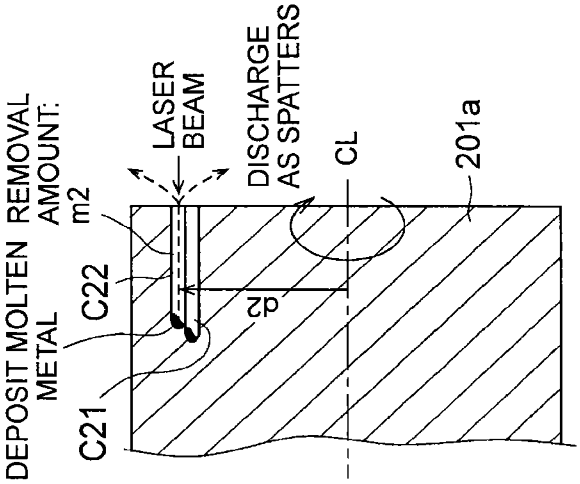

By performing the laser irradiation with respect to the second round position, a second groove C22 is provided in a state where the second groove C22 is connected to the first groove C21 provided earlier by the laser irradiation, as illustrated in FIG. 7B. Also in the laser irradiation with respect to the second round position, not all molten metal spatters, but some of the molten metal remains in the second groove C22 so as to be deposited in a deep end of the second groove C22. Besides, a deposition amount of the molten metal is larger toward an outer peripheral side of the second groove C22 due to the centrifugal force. That is, a groove depth of the second groove C22 is shallower toward the side closer to the outer periphery of the turbine wheel head 201*a*.

When the laser irradiation with respect to the second round position is finished, the process proceeds to step ST305. In step ST305, the laser moving device 2 is controlled to move the laser oscillator 1 outward in the radial direction (the Y-direction) only by a distance corresponding to the irradiation diameter of the laser beam (a radial width of a part to be removed by the laser irradiation). Hereby, the laser irradiation position is moved from the second round position to the third round position (a position at a radius d3: see FIG. 7C) on the outer side relative to the second round position.

In step ST306, the third round position of the turbine wheel head 201*a* is irradiated with the laser irradiation at the irradiation timing as illustrated in FIG. 2A, so as to remove a weight at the imbalance correction position (phase). The removal amount m3 of the weight by the laser irradiation with respect to the third round position is set to be smaller than the removal amount m2 by the laser irradiation with respect to the second round position. Note that the removal amount m1, the removal amount m2, and the removal amount m3 have a relationship of m1·d1=m2·d2=m3·d3.

Figure 7C:
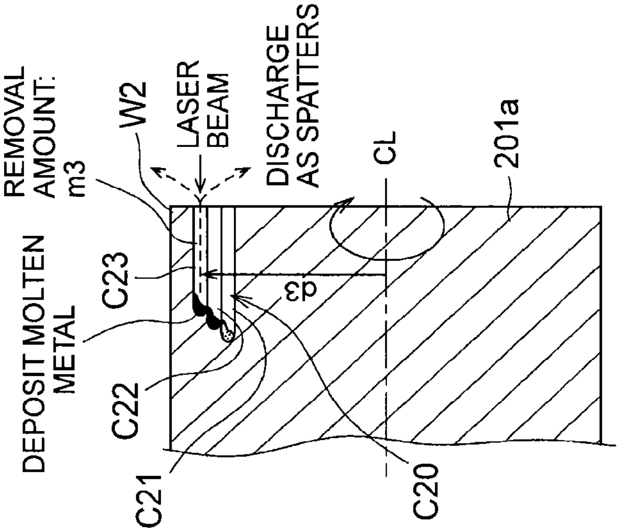

By performing the laser irradiation with respect to the third round position, a third groove C23 provided by the laser irradiation is provided in a state where the third groove C23 is connected to the second groove C22 provided earlier by the laser irradiation, as illustrated in FIG. 7C. Also in the laser irradiation with respect to the third round position, not all molten metal spatters, but some of the molten metal remains in the third groove C23 so as to be deposited in a deep end of the third groove C23. Besides, a deposition amount of the molten metal is larger toward an outer peripheral side of the third groove C23 due to the centrifugal force. That is, a depth of the third groove C23 is shallower toward the side closer to the outer periphery of the turbine wheel head 201*a*.

As described above, the laser irradiation position is moved from the inner side toward the outer side in the radial direction (the laser irradiation position is moved in the order of the first round position, the second round position, and the third round position), and a removal amount by the laser irradiation is made smaller as the laser irradiation position comes closer to the outer periphery of the turbine wheel head 201*a*. Hereby, as illustrated in FIG. 7C, a total depth of a groove C20 (hereinafter also referred to as a corrected groove C20) provided by the laser irradiation becomes shallower toward the side closer to the outer periphery of the turbine wheel head 201*a*.

When the corrected groove C20 is provided such that its groove depth is shallower toward the side closer to the outer periphery of the turbine wheel head 201*a* as such, it is possible to secure a strength of a base part of an outer wall W2 on the outer peripheral side of the corrected groove C20. Hereby, in the use rotation range of the turbocharger 200, it is possible to restrain deformation of the outer wall W2 (FIG. 7C) on the outer peripheral side of the corrected groove C20.

Besides, respective imbalance removal amounts (removal weight×radius) by the laser irradiation at the first round position, the second round position, and the third round position can be made constant ($m1 \cdot d1 = m2 \cdot d2 = m3 \cdot d3$), thereby making it possible to improve accuracy of the balance correction.

This example deals with a case where three positions, i.e., the first to third round positions are irradiated with the laser beam. However, the imbalance correction amount may be removed such that two positions in the radial direction of the turbine wheel head 201*a* are irradiated with the laser beam or the imbalance correction amount may be removed such that four or more positions in the radial direction of the turbine wheel head 201*a* are irradiated with the laser beam.

Note that, even in a case where one position in the radial direction of the turbine wheel head 201*a* is irradiated with the laser beam, it is still possible to make the depth of the first groove C21 shallower toward the side closer to the outer periphery of the turbine wheel head 201*a* by depositing the molten metal, as illustrated in FIG. 7A.

<Other Embodiments> It should be noted that the embodiments described herein are just examples in all respects and are not limitative. Accordingly, the technical scope is not interpreted only by the above embodiments, but is defined based on the description in Claims. Further, the technical scope includes all modifications made within the meaning and scope equivalent to Claims.

For example, the above embodiments deal with an example in which the balance correction device is used for balance correction of the turbine wheel 201. However, the present disclosure is not limited to this, and may be applied to balance correction of the compressor impeller 202. Further, the balance correction device may have a structure in which the turbine wheel 201 and the compressor impeller 202 individually include respective laser oscillators that emit a laser beam, so that balance correction may be performed on both of the turbine wheel 201 and the compressor impeller 202.

The above embodiments deal with an example in which the balance correction device is applied to balance correction of the turbine wheel 201 and the compressor impeller 202 of the turbocharger 200. However, the present invention is not limited to this, and can be applied to balance correction of any other rotors.

The present disclosure is usable as a balance correction device for a rotor such as a compressor impeller or a turbine wheel of a turbocharger. The balance correction device corrects balance of the rotor.

What is claimed is:

1. A balance correction device for a rotor, the balance correction device correcting balance of the rotor, the balance correction device comprising:

a rotary drive to rotate the rotor around a rotation axis of the rotor;

a laser oscillator to remove a part of the rotor by irradiating the rotor with a laser beam from a rotation-axis direction of the rotor;

a rotation angle sensor to detect a rotation angle of the rotor;

an irradiation position setting device to set a laser irradiation position in a radial direction of the rotor; and a controller configured to:

control the rotary drive, the laser oscillator, and the irradiation position setting device;

irradiate an imbalance correction position of the rotor with the laser beam based on an output of the rotation angle sensor so as to leave an outer peripheral portion of the rotor; and control a radial position of the laser irradiation position, a rotation speed of the rotor, and a laser output of the laser oscillator to form a groove in the rotor by the laser irradiation with a groove depth, in the rotation-axis direction, shallower toward a side closer to an outer periphery of the rotor.

2. The balance correction device for the rotor, according to claim 1, wherein the controller is configured to:

control the rotation speed of the rotor and the laser output to deposit a molten material generated by the laser irradiation in the groove; and form the groove depth shallower toward the side closer to the outer periphery of the rotor, by moving the laser irradiation position with respect to the rotor from an outer side to an inner side in the radial direction of the rotor.

3. The balance correction device for the rotor, according to claim 2, wherein the controller is configured to increase the rotation speed of the rotor as the laser irradiation position comes inward in the radial direction.

4. The balance correction device for the rotor, according to claim 1, wherein the controller is configured to:

move the laser irradiation position with respect to the rotor from an inner side to an outer side in the radial direction of the rotor; and decrease a removal amount by the laser irradiation to be smaller as the laser irradiation position with respect to the rotor comes closer to the outer periphery of the rotor.

5. The balance correction device for the rotor, according to claim 1, further comprising:

an acceleration sensor to detect an acceleration of the rotor, wherein the controller is configured to determine the imbalance correction position of the rotor based on respective outputs from the rotation angle sensor and the acceleration sensor.

6. The balance correction device for the rotor, according to claim 1, wherein the rotary drive is an air feeder that drives air to rotate a turbine wheel of the rotor.

* * * * *